Aug. 23, 1960 — A. R. FORSBERG — 2,950,006
ROUGHING DOWN MACHINE FOR CLEANING GRAIN, BEANS AND THE LIKE
Filed June 19, 1958
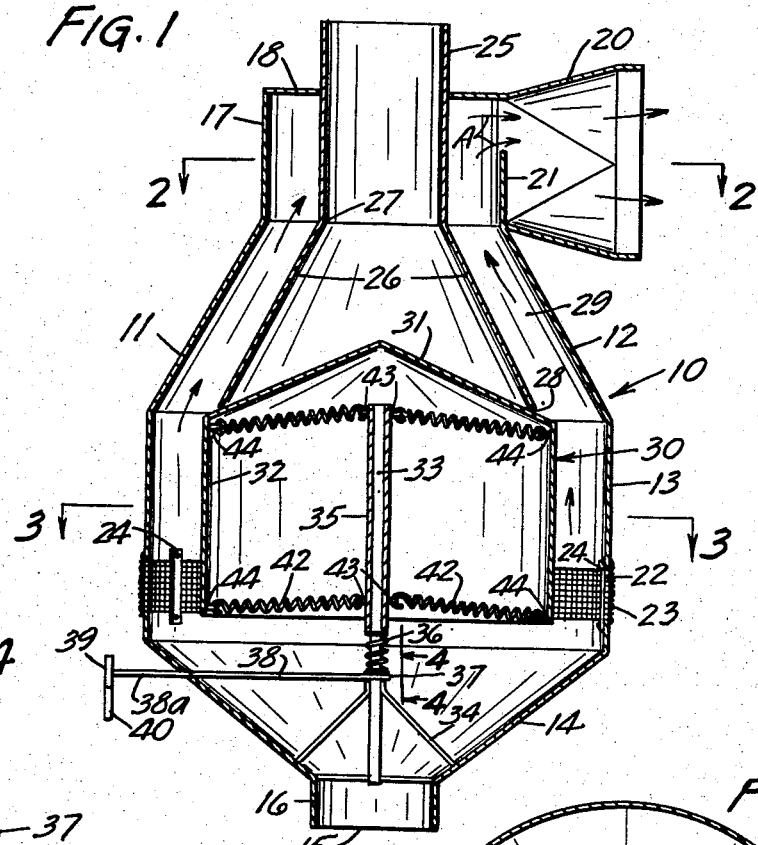
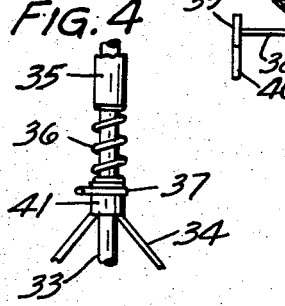
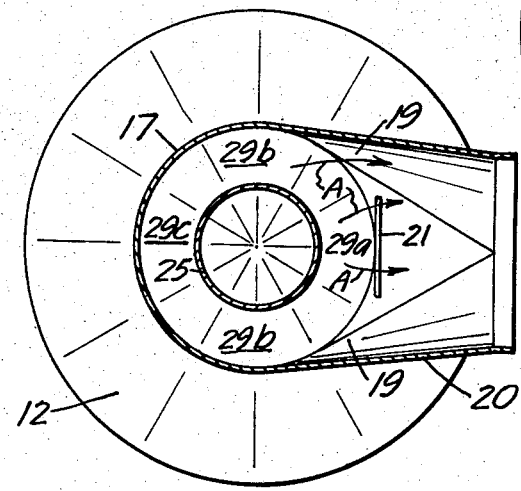
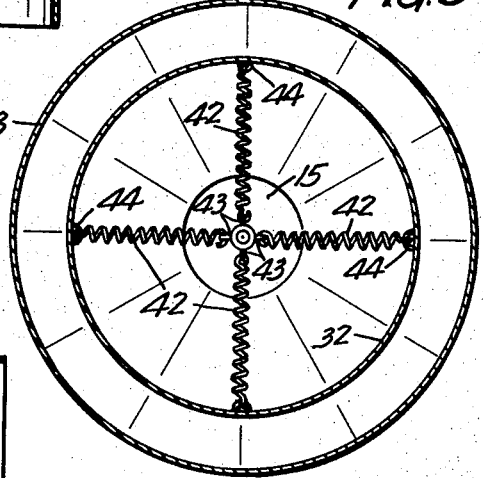
INVENTOR
ARTHUR R. FORSBERG
BY Williamson, Schroeder & Palmatier
ATTORNEYS United States Patent Office 2,950,006
Patented Aug. 23, 1960

2,950,006

ROUGHING DOWN MACHINE FOR CLEANING GRAIN, BEANS AND THE LIKE

Arthur R. Forsberg, Thief River Falls, Minn.

Filed June 19, 1958, Ser. No. 743,210

4 Claims. (Cl. 209—138)

This invention relates to a roughing down machine for removing a substantial proportion of lightweight or low density materials, such as straw and hulls, from grain and the like.

An object of my invention is the provision of a new and improved roughing down machine of simple and inexpensive construction and operation for removing a sufficient proportion of the straw, hulls and the like from grain so that the grain will contain only two to three percent of dust and other impurities.

Another object of my invention is the provision of a novel roughing down machine wherein air is caused to flow in a counter direction relative to the falling grain and is caused to move at progressively increasing velocities so as to remove a maximum of impurities from the grain.

A further object of my invention is to provide a new and novel roughing down machine which continuously controls the flow of grain so as to supply the grain at a proper rate for maximum cleaning efficiency.

These and other objects and advantages of my invention will more fully appear from the following description made in connection with the accompanying drawings wherein like reference characters refer to the same or similar parts throughout the several views and in which:

Fig. 1 is a section view taken on a substantially vertical plane through the invention;

Fig. 2 is a section view taken on a substantially horizontal plane as indicated at 2—2 in Fig. 1;

Fig. 3 is a section view taken on a substantially horizontal plane as indicated at 3—3 in Fig. 1; and Fig. 4 is a detail elevation view taken approximately at 4—4 in Fig. 1.

One form of the present invention is shown in the drawings and is described herein.

The roughing down machine, which is indicated in general by numeral 10 is adapted for mounting on top of a grain storage elevator. The machine 10 includes the generally circular and upright housing 11 having an upwardly convergent, substantially conical upper wall portion 12 and a substantially cylindrical lower wall portion 13. The bottom portion 14 of the housing tapers inwardly and has an opening 15 at the bottom thereof to provide a grain discharge. The tubular opening-defining portion 16 of the housing is attachable to a grain discharging conduit or may be directly attachable to the top of an elevator or the like. The top of the housing 11 has a generally cylindrical wall 17 and a flat top 18. An air outlet opening 19 is provided at one side of the cylindrical wall 17, and a substantially tubular conduit connection 20 is secured to the side of the wall 17 and is attachable to a source of vacuum pressure such as a suction fan or the like and for purposes of the present application, the conduit portion 20 may be regarded as a source of vacuum pressure to draw air outwardly through the opening 19.

The air outlet 19 has an upstanding air baffling plate 21 therein which extends transversely of the opening into spaced relation with the opposite sides of the opening so as to permit outward flow of air over the baffle plate and around the ends thereof in the manner indicated by the arrows A in Figs. 1 and 2.

The lower cylindrical sidewall portion 13 of the housing 11 is provided with an elongated air inlet opening 22 which extends peripherally around the entire cylindrical sidewall 13 so as to allow substantially uniform inflow of air in all peripheral portions of the housing. The air inlet opening 22 is covered by a screen 23 and the spaced portions on opposite sides of the air inlet opening 22 are held in predetermined relation with each other by any suitable means such as a plurality of rigid straps 24.

A supply conduit 25 for carrying the mixture of grain and straw and hulls and the like which are to be separated from the grain, extends downwardly through the top panel 18 of the housing. Means are provided in the housing 11 for spreading and directing the downward flow of the mixture of grain and straw and hulls and the like into a free-falling condition around the interior periphery of the housing sidewall and also for directing the upward flow of air through the falling mixture and causing the air to move at a progressively increasing velocity as the air moves upwardly through the housing toward the air outlet 19. In the form shown, such means includes a downwardly flared spout 26 which is constructed of an upwardly convergent and substantially conical panel affixed as by welding at its upper edge 27 to the conduit 25 and having the lower edge 28 thereof disposed well above the air inlet opening 22 in the housing sidewall. The flared spout 22 is spaced inwardly from the conical portion 12 of the housing sidewall and cooperatively defines therewith an airflow passage 29 which is generally annular in shape but which has a substantially greater diameter, and therefore area, at the lower end than at the upper end thereof. Because the air flow passage 29 progressively diminishes in size from the bottom portion thereof to the upper portion adjacent the air outlet, the air flowing upwardly therethrough will move at a progressively increasing rate of speed so as to increase the light material-carrying capability of the air flowing through the passage 29 and toward the air outlet 19. Such air and grain-straw guiding means also includes a valve apparatus indicated in general by numeral 30 for controlling the downward flow of the mixture from the conduit 25. In the form shown, the valve apparatus 30 includes an upwardly convergent conical mixture spreader 31 normally having its periphery in engagement with the lower edge 28 of the spout 26 and a cylindrical air and grain-straw mixture guilding wall 32 which is affixed to the spreader 31 around the periphery thereof in depending relation and extending downwardly into opposed relation with the air inlet opening 22 of the housing sidewall.

Means are provided for vertically adjustably mounting the valve apparatus 30 in the housing and in the form shown, such means comprise an upright rigid post 33 affixed as by brackets 34 to the lower portion of the housing. An upwardly and downwardly movable sleeve 35 is slidable on the post 33 and is supported thereon by a compression spring 36, the upper end of which bears against the lower end of the sleeve 35, and the lower end of the spring bears against a cam or control arm 37 which is oriented transversely of rod 38 and is swingable to raise the lower end of the spring when the rod 38 is rotated. The outer end 38a of rod 38 projects outwardly through the housing sidewall and has a sprocket 39 thereon which is controllable by means of a chain 40. The cam arm 37 normally lies against a rigid collar 41 which is stationary with the post 33 and with the bracket 34 so that when the shaft 38 is rotated, the lower end of the spring 36 is urged upwardly so as to urge the sleeve 35 upwardly.

A plurality of tension springs 42 extend substantially radially outwardly from the upright sleeve 35 and are fixed to ears 43 thereon. The outer ends of springs 42 are affixed to ears 44 on the inner side of wall 32 to thereby yieldably mount the valve apparatus 30 for vertical movement with respect to the spout 26.

In operation, the vacuum air pressure in the conduit 20 causes upward flow of air through the air inlet opening 22 and upwardly through the housing in the direction of the arrows shown. The mixture of grain and straw and hulls and the like which are to be separated is supplied downwardly through the conduit 25 and into the spout 26, whereupon, when a substantial quantity of the mixture rests upon the spreader 31, the valve apparatus 30 is moved downwardly under the influence of the weight of the mixture and the mixture is allowed to flow in multi-directions over the peripheral edge of the spreader 31 and into free-falling condition between the cylindrical wall 32 and the lower housing wall portion 13 and past the air inlet 22. The upwardly sweeping air travels through the free-falling mixture and carries the light material such as straw, hulls and the like upwardly and separates the same from the grain which is allowed to fall downwardly into engagement with the tapered lower portion 14 of the housing and then to the grain discharge 15. When the upwardly flowing air, which is laden with light materials flows along the upwardly convergent upper housing wall portion 12 and through the air passage 29, the velocity of travel of the air is progressively increased because the diameter of the substantially annular air passage 29 is progressively decreased in an upward direction, and even though the air may be quite heavily laden with straw, hulls and the like, all of these light materials will be successfully carried to the air outlet 19 and to the conduit 20. The upwardly projecting baffle 21 at the lower side of the air outlet 19 tends to equalize the upward flow of air in substantially all portions, such as at 29a, 29b and 29c of the air flow passage 20 so that the separation of grain from the light materials is substantially uniform around the entire periphery of the housing.

It should be understood that the grain passing downwardly through the grain discharge 15 will contain approximately 2 to 3 percent impurities, but it should further be understood that the present machine is primarily for the purpose of rough-cleaning grain so that the grain may subsequently be absolutely cleaned of all impurities. It has been experienced that the present machine, which in one instance has an outside diameter of approximately three feet, has capacity for cleaning one thousand to fifteen hundred bushels of beans or grain per hour. When the supply of the mixture in the conduit 25 is substantially exhausted, the weight of the mixture will no longer hold the valve apparatus 30 in downwardly spaced relation from the spout edge 28 and the spreader 31 will move upwardly into engagement with the edge 28 to stop the flow of the mixture over the spreader. Substantially the entire upward and downward movement of the valve apparatus 30 is controlled by the radial tension springs 42. However, it should be specifically noted if certain types of grain or beans are being handled, it may be desirable to increase the tension on springs 42 by raising the mounting sleeve 35 upwardly by rotating the shaft 38 and arm 37 through sprocket 39 and chain 40. Under these conditions, the downward movement of the valve apparatus 30 under the influence of the weight of the beans or grain in the conduit 25 is limited and the grain or beans are allowed to pass over the periphery of the spreader at such a rate as to permit separation of the straw and hulls to the extent hereinbefore set forth.

It is to be noted that the valve apparatus 30 substantially prevents any flow of air through the conduit 25, and furthermore, because the air inlet 22 is disposed well above the grain discharge 15 there is substantially no air flow through the grain discharge 15.

It will be noted that I have provided a new and improved roughing down machine for separating light materials such as straw, and hulls from grain, beans and the like by passing air through the mixture of grain and straw while the mixture is in free-falling condition and progressively increasing the velocity of the air which is then laden with light materials such as straw and hulls and thereby causing the light materials to be easily carried away and to result in thorough cleaning of the grain or beans.

It will, of course, be understood that various changes may be made in the form, detail, arrangement and proportion of the parts without departing from the scope of my invention which consists of the matter described herein and set forth in the appended claims.

What I claim is:

1. A roughing down machine for moving light materials such as straw and hulls from grain and the like, comprising an upright housing having an enclosing sidewall with an upwardly converging upper portion and also having an air outlet through the sidewall at the top of the housing, a source of vacuum air pressure connected to the air outlet, the housing also having a grain discharge at the bottom thereof, and said housing also having air inlet means between the air outlet and grain discharge to permit inflow of air at a multiplicity of positions around the periphery of the enclosing sidewall, a supply conduit for the mixture of grain and light materials and having a discharge end opening downwardly in the housing, air and mixture guide means adjacent the discharge end of the conduit and including an upwardly convergent, generally cone-shaped spreader above the air inlet and below the conduit discharge end and in alignment therewith for spreading and directing the mixture toward the sidewall of the housing, an enclosing air and mixture guiding panel depending from the peripheral edge of the spreader to the air inlet means of the wall and spaced from the housing wall, means mounting the spreader in the housing, a downwardly flaring and enclosing air guiding panel suspended from the conduit and defining a spout supplying the mixture onto the spreader said flaring panel being spaced from the upper portion of said wall to cooperatively define therewith an air flow passage carrying the air to the air outlet, said air flow passage progressively decreasing in size from the spreader to the air outlet and in an upward direction to cause the upwardly flowing air to move at an increasing velocity toward the air outlet, whereby the light materials from the mixture which falls freely from the periphery of the spreader, are separated from the grain by the upwardly flowing air and are carried at an increasing velocity to the air outlet.

2. A roughing down machine for removing light materials such as straw and hulls from grain and the like, comprising a housing having an air outlet at the top thereof, a source of vacuum air pressure connected to the outlet, the housing also having a grain discharge at the bottom thereof, and said housing also having an air inlet between the air outlet and the grain discharge, a supply conduit for the mixture of grain and light materials, said conduit extending downwardly through the top of the housing in spaced relation with the sidewall of the housing, and said conduit having a lower end edge positioned above the air inlet, a generally conical upwardly convergent spreader below the conduit and aligned therewith and having the periphery engaging the lower end edge of the conduit, an upright enclosing wall affixed to and depending from the periphery of the spreader and spaced from the sidewall of the housing, an upright elongate mounting secured to the housing and extending upwardly within the enclosing wall and into proximity with the spreader, and a plurality of substantially horizontally oriented tension springs secured to said mounting and to peripherally spaced portions of the enclosing depending wall for resiliently mounting the spreader to allow the same to move downwardly under the weight of quantity of mixture in the supply conduit and cause distribution and free falling of the mixture over the periphery of the spreader and thereby permit the upwardly flowing air from the inlet to separate and carry the light materials to the air outlet while the grain is permitted to fall to the grain discharge.

3. The invention set forth in claim 2 and including means controllably adjusting the vertical position of said mounting whereby to change the spring bias on the spreader and thereby control the rate of flow of the mixture over the spreader.

4. The invention set forth in claim 1 and an upwardly standing baffle plate in the outlet and extending into spaced relation with the opposite sides thereof whereby to cause substantially equal upward flow of air through all sides of the housing.

References Cited in the file of this patent

UNITED STATES PATENTS

| | | |
|---|---|---|
| 1,756,960 | Stebbins | May 6, 1930 |
| 2,795,329 | Schaub | June 11, 1957 |

FOREIGN PATENTS

| | | |
|---|---|---|
| 87,952 | Norway | Aug. 27, 1956 |
| 305,407 | Switzerland | May 2, 1955 |
| 715,601 | Great Britain | Sept. 15, 1954 |